Feb. 21, 1956  R. G. MILLER  2,735,096
NAILING MACHINE, HOPPER, FEEDER AND PICKER MECHANISM
Filed Feb. 8, 1954  4 Sheets-Sheet 1

INVENTOR.
ROBERT G. MILLER,
BY Harold B. Hood.
ATTORNEY.

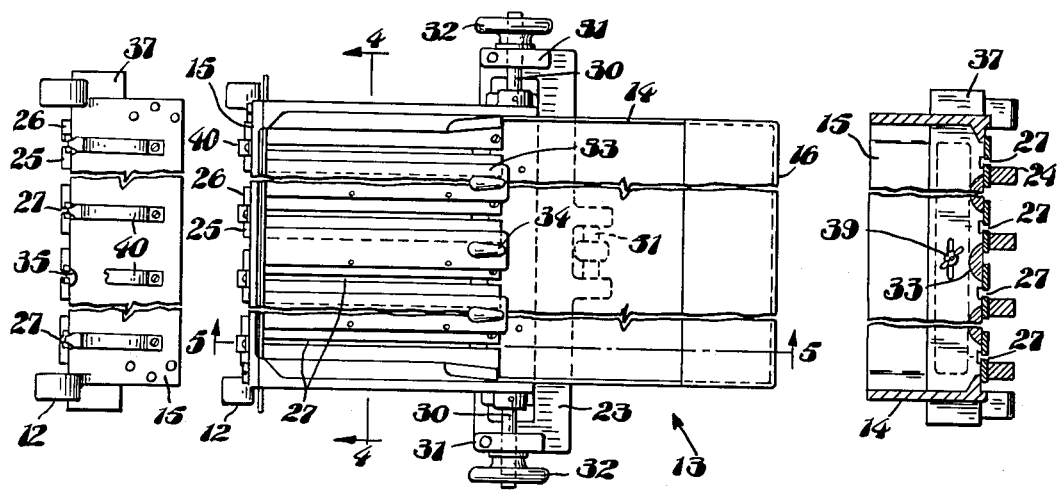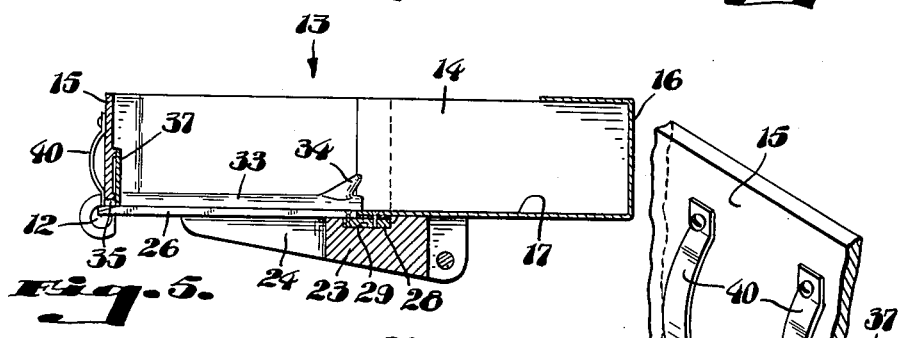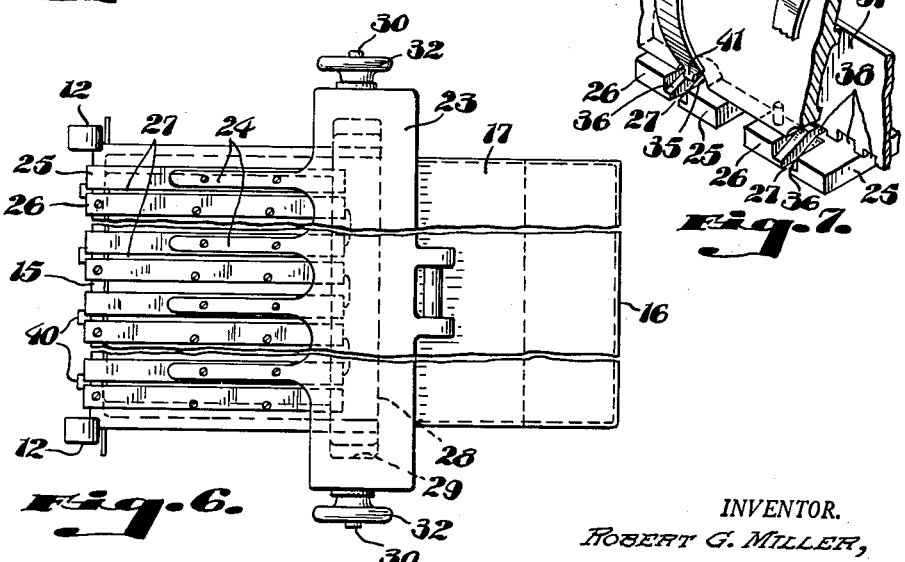

Feb. 21, 1956  R. G. MILLER  2,735,096
NAILING MACHINE, HOPPER, FEEDER AND PICKER MECHANISM
Filed Feb. 8, 1954  4 Sheets-Sheet 3

INVENTOR.
ROBERT G. MILLER,
BY:
Harold B. Hood
ATTORNEY.

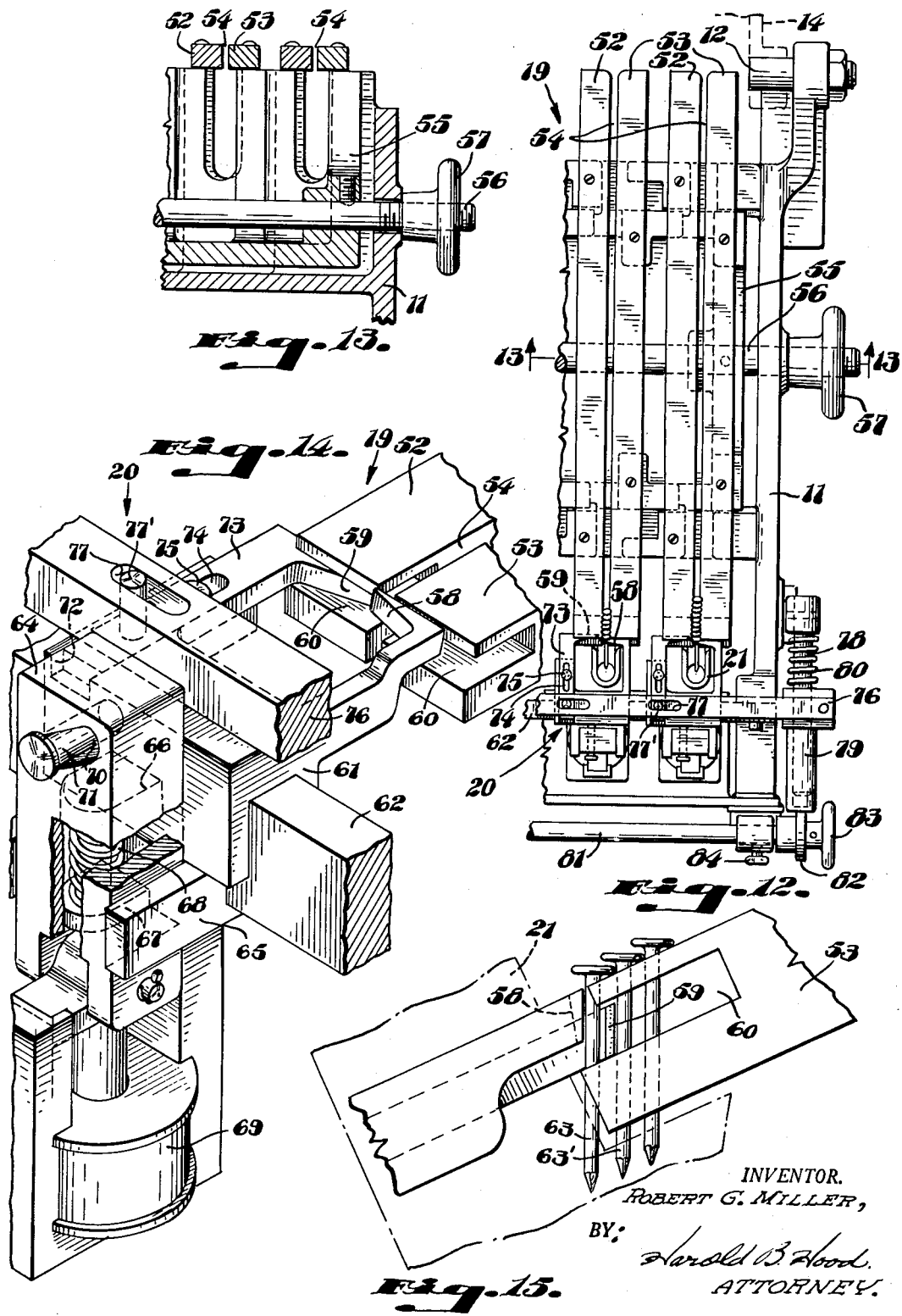

United States Patent Office 2,735,096
Patented Feb. 21, 1956

2,735,096

NAILING MACHINE, HOPPER, FEEDER AND PICKER MECHANISM

Robert G. Miller, Wabash, Ind., assignor to The G. M. Diehl Machine Works, Inc., Wabash, Ind., a corporation of Indiana Application February 8, 1954, Serial No. 408,646

15 Claims. (Cl. 1—16)

The present invention relates to a nailing machine and particularly to means in such a machine for separating and arranging a mass of loose nails into single files of nails, and for removing the nails one at a time from such files for application to the work-piece passing through the machine.

The primary object of the invention is to provide, in such a machine, a novel hopper mechanism which can be adjusted to accommodate nails of various sizes and which will, due to its novel construction, more readily and efficiently separate a mass of nails and deliver the nails serially from the hopper. Another object is to provide a novel means for driving the hopper which will materially aid in the separation of the nails.

A further object of the invention is to provide feeder means for receiving the nails from the hopper mechanism and for storing the nails in singe files such means being adjustable to accommodate nails of varying sizes.

Another object is to provide picker means for removing the nails one at a time from the feeder means for delivery to mechanisms in the machine for applying the nails to the workpiece, such picker means likewise being adjustable to accommodate nails of varying sizes.

Further objects of the invention will appear as the description proceeds.

To the accomplishment of the above and related objects, my invention may be embodied in the form illustrated in the accompanying drawings, attention being called to the fact, however, that the drawings are illustrative only, and that change may be made in the specfic construction illustrated and described, so long as the scope of the appended claims is not violated.

Fig. 2 is a plan view of the hopper mechanism constituting a part of my invention;

Fig. 3 is an end elevation of the hopper of Fig. 2 looking from the left of Fig. 2;

Fig. 4 is a sectional view taken substantially on line 4—4 of Fig. 2 and looking in the direction of the arrows;

Fig. 5 is a longitudinal sectional view through the hopper of Fig. 2 taken substantially on line 5—5 thereof.

Fig. 6 is a bottom plan view of the hopper of Fig. 2;

Fig. 7 is an enlarged fragmentary perspective view of a portion of the front wall of the hopper mechanism of Fig. 2;

Fig. 12 is a partial plan view, on an enlarged scale of the feeder and picker mechanisms constituting a part of my invention;

Fig. 13 is a sectional view substantially on line 13—13 of Fig. 12 and showing a detail of the feeder adjustment mechanism;

Fig. 14 is a fragmentary perspective view, on a greatly enlarged scale, of the picker mechanism of my invention; and Fig. 15 is a fragmentary side elevation, drawn to a further enlargement, showing the cooperation between the feeder and picker mechanism of my invention.

Figure 1:
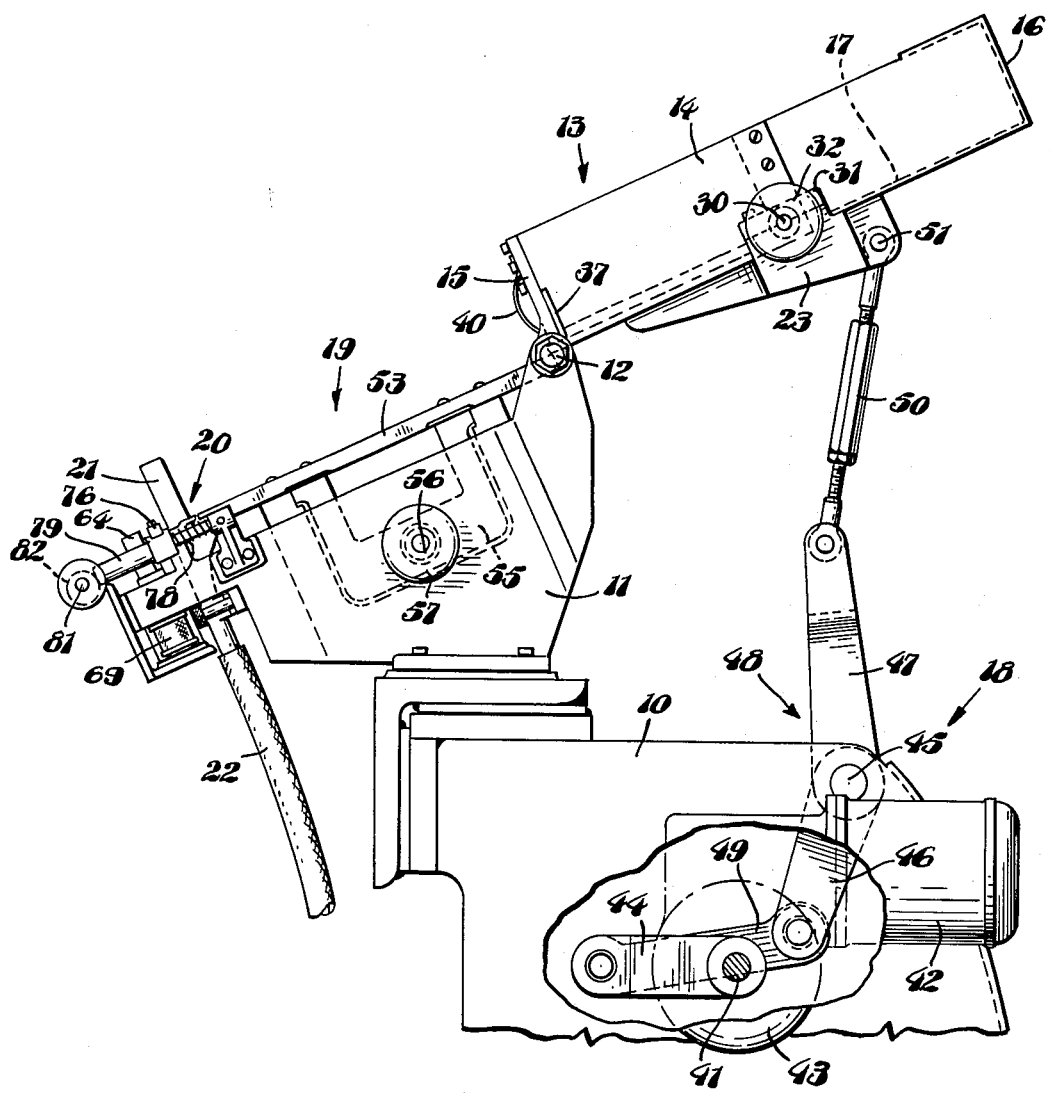
Fig. 1 is a side elevation of the hopper, feeder, and picker mechanisms of a nailing machine constituting my invention.

Referring more particularly to the drawings, and especially to Fig. 1, that part of the nailing machine here under consideration comprises a base 10 supporting a frame 11. Near one edge of frame 11, I provide a pair of coaxial studs forming a pivotal axis 12 for a hopper mechanism 13. Such mechanism comprises a box 14 having a front wall 15, a rear wall 16 and a floor 17 intersecting the front wall substantially along axis 12. The hopper 13 is adapted to be swung about the axis 12 between its illustrated inclined position and a position oppositely inclined to the horizontal plane through axis 12. Driving mechanism, referred to generally by the reference numeral 18, is operatively connected to hopper 13 to move it between its two said positions in a manner later to be described.

Frame 11 supports a feeder mechanism constituting a bed 19 inclined downward from axis 12, and a picker mechanism, referred to generally by the reference numeral 20, is arranged at the lower end of the feeder mechanism. A chute or funnel 21 is arranged to receive nails from the picker mechanism 20 and to deliver them one at a time, through a flexible tube 22 to another part of the machine, not here of importance to the present invention.

Referring now to Figs. 2–7, it will be seen that the hopper mechanism constitutes a base member 23 provided with a plurality of fingers 24 projecting toward axis 12. That portion of floor 17 of box 14 between the base member 23 and the front wall 15 is comprised of a plurality of pairs of slat members 25 and 26 spaced slightly apart to define slots 27 opening through the forward end of floor 17 beneath front wall 15. An elongated plate 28 is slidably received in a guide groove 29 in member 23, and the slats 26 of each pair are fixed at one end to front wall 15 and at the other end to plate 28. The slats 25 of each such pair are fixed to the fingers 24 of member 23.

Box 14 is provided with a pair of oppositely projecting, substantially coaxial stub shafts 30 taking through bosses 31 on the base member 23. The ends of these shafts are threaded and nuts 32 are received thereon to be turned up against bosses 31. Thus, it will be seen that by loosening one of the nuts 32 and tightening the other such nut, base member 23 can be shifted relative to box 14 to move slats 25 toward or away from slats 26 to vary the width of slots 27, for a purpose later to become apparent.

Rib members 33 are provided between each of the pairs of slat members and each such rib member is fixed to a slat of one such pair but left free for movement relative to the adjacent slat of that pair. Each rib 33 is provided with an upstanding finger 34 near the end thereof remote from front wall 15.

The front wall 15 is provided with a downwardly opening notch 35 registering with each of the slots 27 in box 14, and the ends of the slats 25 and 26 are tapered beneath the front wall 15, as shown at 36 in Fig. 7, from a point just inside of wall 15 to the ends of the slat members. A masking plate 37 is slidably supported behind front wall 15 and closely adjacent thereto. The width of slots 27 can be varied to accommodate nails of varying sizes. The notches 35 are made wide enough to span the widest slot 27 to which the slat members 25 and 26 can be adjusted. The different size nails each have a different size head and, for this reason, the masking plate 37 is provided with a plurality of groups of rectangular, downwardly opening notches 38, each of a different size, for selective registration with the slots 27 according to the size of the nails then being used in the machine. One or more stud and nut arrangements 39 are provided for locking plate 37 in any of its selective positions.

In operation, a batch of loose nails is dumped into box 14 and the box is oscillated between its upper and lower positions. In its upper position, the nails will fall toward front wall 15. Certain of the nails will fall lengthwise into the valleys between the ribs 33 and their shanks will drop through slots 27, the heads being supported on the slats 25 and 26. These nails will slide down the inclined slats, through the openings 38 in masking plate 37, down the inclined slat surfaces 36 beneath front wall 15, and onto the bed of the feeder mechanism 19, soon to be described. Certain of the nails, however, will not be in alignment with slots 27 but will have one end resting on a rib 33. Due to this condition, as such nails are moved toward front wall 15, they will have a tendency to turn and align themselves with slots 27. Those nails which fail to so align themselves will be returned to the mass of nails upon opposite movement of hopper 13.

As the hopper 13 is moved to its upper position, the mass of nails will fall toward the front wall of the hopper box. It is necessary to prevent the entire mass from stacking up against the masking plate 37 since, should this occur, very few nails would find their way into slots 27. For that reason, I have provided the fingers 34 on the ribs 33. As the nail mass moves toward plate 37, the majority of the nails not in alignment with slots 27 will be stopped by fingers 34. Those which are not stopped, will rest on the ribs 33 and be encouraged to align themselves with the slots, as explained above.

When the nails are first placed in the hopper box, they are somewhat entangled and, while mere oscillation of the hopper will tend to reduce such entanglement, I have found that if the box is moved in a particular way, the nails will more readily separate and align themselves with slots 27. I have found that by causing box 14 to dwell momentarily in its upper position (to permit the nails in slots 27 to move out of the hopper) and then by moving the box relatively slowly to a nearly horizontal position and then jerking it rapidly to its lowermost position, the nails will actually leave the floor of the box and drop again to the box floor as the box reaches its lower position. This tends to loosen the nails from their massed condition. If the box is then raised fairly rapidly to its top position the nails will be tossed slightly into the air thereby further reducing their entanglement.

To accomplish this movement of the hopper box 14, I provide the driving mechanism illustrated in Fig. 1 and shown in various positions in its cycle in Figs. 8–11. Such mechanism comprises a first shaft 41 supported on base 10 substantially parallel to the hopper axis 12 but spaced downwardly therefrom. A motor 42 is drivingly connected to shaft 41 through a reduction unit 43 to turn shaft 41 continuously in one direction. A crank-arm 44 is fixed to said shaft for rotation thereby.

Base 10 supports a second shaft or fulcrum means 45 spaced from shaft 41 in the direction of hopper 13. A pair of arms 46 and 47 are fixed to shaft 45 to form a bell-crank lever 48. A link 49 is pivotally connected between the distal end of crank-arm 44 and the arm 46 of the bell-crank lever 48. For a purpose later to become apparent, it is necessary that the combined length of link 49 and arm 46 be slightly greater than the length of crank-arm 44 added to the distance between the axes of shafts 41 and 45.

A further link, preferably in the form of a turn-buckle unit 50, is connected at one end to lever arm 47 and at the other end, as at 51, to the base member 23 of hopper 13.

Figure 11:
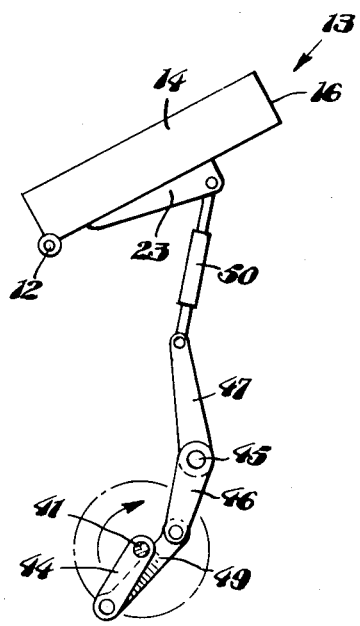

From a consideration of Fig. 11, it will be noted that, when the pivotal connection between crank-arm 44 and link 49 lies in the line through the axes of shafts 41 and 45, the end 16 of the box 14 will be in its uppermost position. The crank-arm is about 30° removed from the vertical in this position. As shaft 41 is rotated, in the direction of the arrow, from its position in Fig. 11 to its position in Fig. 1 (about 60°) it will be seen that the box 14 moves only slightly out of its uppermost position (no more than 5°). For my purpose it will seem to dwell in that position.

Figure 8:
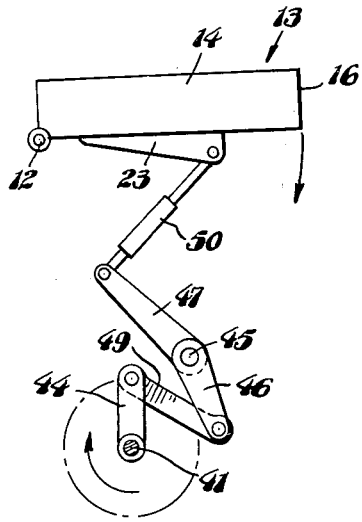
Figs. 8–11 are more or less diagrammatic side elevations showing the action of the driving mechanism for the hopper and the motion through which the hopper is driven.

With the next 90° movement of shaft 41, the hopper box 14 will move slowly out of its uppermost position to a more or less horizontal position illustrated in Fig. 8. Continued movement of shaft 41 will swing box 14 from its position in Fig. 8 to its lowermost position in Fig. 9 in which the link 49 will be in line with the crank arm 44. Since this degree of movement of box 14 is accomplished in approximately fifty degrees rotation of shaft 41, the box will be literally jerked from a horizontal position to a steeply inclined position causing the nails to leave the box bottom 17 as described above.

Figure 9:
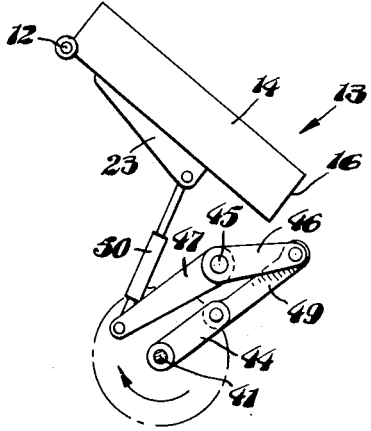
Figure 10:
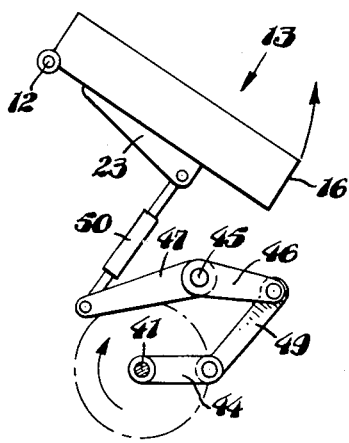

In moving from its position in Fig. 9 to its position in Fig. 10, (approximately 40°) shaft 41 will have started box 14 moving rather slowly, and then with increasing speed toward its upper position. In the next 90° movement of shaft 41, box 14 will be pushed rapidly toward its upper position, and further movement of the shaft as it approaches its position in Fig. 11 will move the box 14 only slightly.

Thus, it will be seen, that by means of a relatively simple linkage arrangement, I convert constant speed rotation of a shaft into such movement of hopper box 14 as to greatly improve the function of the hopper unit.

Some types of nailing jobs being performed by the machine require that nails be delivered only through certain of the hopper openings 35. Those openings through which no nails are required to be delivered must, therefore be blocked against passage of the nails. To this end, I have provided the leaf springs 40, one for each of the hopper openings 35. One end of each spring is fixed to the hopper front wall 15 by means of a screw, or the like, and the other end 41 is arranged to completely block the opening 35 with which it is associated. I have illustrated such a spring 40 in blocking position with each of the hopper openings 35. It will be understood, of course, that for every opening 35 through which nails are intended to pass, the end 41 of the spring will be lifted out of blocking position in the opening and the spring will be swung about its anchorage screw on front wall 15 to permit the end 41 to rest against the outer face of the front wall. The resiliency of spring 40 will hold the spring from returning accidentally into blocking position in front of its opening 35.

The inclined bed 19 of the feeder mechanism is composed of a plurality of pairs of slat members 52 and 53 (Figs. 12–15) spaced slightly apart to form slots 54 opening through the upper and lower edges of bed 19. The upper ends of such slots are arranged in registry with the adjacent ends of the slots 27 in hopper 13. The slats 52 of each such pair are fixed to the frame 11. Frame 11 is provided with a carriage 55 guided thereon for movement along a path normal to slats 52. A shaft 56 spans frame 11 penetrating suitable bosses in carriage 55 and is fixed to said carriage. The opposite ends of shaft 56 are threaded and nuts 57 are received thereon to be turned up solidly against frame 11. The slats 53 are fixed to carriage 55 and, by loosening one nut 57 and tightening the other, the slats 53 can be moved toward and away from slats 52 to vary the width of slots 54. Thus, the slots 54 can be adjusted to accommodate the size of nail then being used.

As nails are discharged from hopper slots 27, they fall into the feeder slots 54 and slide toward the ends of said slots where they are held back by mechanism now to be described. (See Fig. 12.)

In the machine for which my invention is intended primarily for use, it is necessary that the nails be released one at a time from the slots 54. For this purpose I provide the picker mechanisms 20, one for each of said slots 54. Each such mechanism comprises a pair of finger elements 58 and 59, mounted adjacent the discharge end of a slot 54 and projecting toward each other (see particularly Fig. 14). The adjacent ends of the slats 52 and 53 are bifurcated to form a groove 60 in each slat substantially parallel to the plane of the upper surfaces of slats 52 and 53. Finger 58 is arranged with its distal end overlying the end of slot 54, as clearly shown in Fig. 14, with the top of said finger substantially in the plane of slats 52 and 53.

Finger 59 is arranged in groove 60 of the slat 52 and projects toward the slot 54 (see Fig. 12) terminating, normally, just short of said slot. The fingers are supported in such positions that the nails 63 hanging in slot 54 will accumulate in a single file and be held against escape from the slot by the finger 58. (See Fig. 15.) To release a nail from the slot, the fingers are moved to the right, as viewed in Figs. 12 and 14. This moves finger 58 out of blocking association with the nail 63, and moves the finger 59 simultaneously into blocking association with the next nail 63' in the slot 54. Nail 63 will then fall out of the slot 54 and into the funnel 21 (Figs. 1 and 12) where it will be carried by way of tubing 22 to another part of the machine not here of importance. Opposite movement of the fingers will move finger 59 out of blocking engagement with nail 63' permitting that nail to move down slot 54 into engagement with finger 58.

To support and guide the fingers in such movement, I provide a rail member 62 spanning the frame 11 and spaced slightly from the lower ends of slats 52 and 53. A shoe member 61 is channeled for reception on rail 62 and supports the fingers 58 and 59 in their proper positions.

A slide member 64 is guided between a pair of arms, provided by a bracket 65 supported from rail 62, for reciprocatory movement along a fixed path adjacent shoe 61 and substantially normal to the line of movement of said shoe. Member 64 has a socket 66 formed therein opening toward shoe 61, and bracket 65 provides a lip 67 projecting into socket 66. A coiled spring 68 is confined in socket 66 and bears against lip 67 to urge slide member 64 to its uppermost position shown in Fig. 14.

Slide member 64 is provided further with a slot 70 opening toward shoe member 61 and angularly inclined relative to the plane of bed 19. A pin 71 passes through slot 70 and is fixed to shoe member 61. As member 64 is moved downward from its illustrated position, the pin 71 is forced to the right in slot 70 to move the shoe member 61 and the fingers 58 and 59 to the right, for the above described purpose.

A solenoid 69 is operably connected to drive the slide member downwardly, said member being returned to its illustrated position by spring 68.

As said before, it is intended that the machine be capable of handling different size nails. Since nails of differing sizes are of different diameters, it is necessary that the off-set distance between fingers 58 and 59 be capable of variation to adjust to nails of varying diameters. I therefore fix finger 58 solidly to shoe 61 but make finger 59 capable of adjustment on said shoe.

Shoe member 61 is formed with a trackway, here in the form of a groove 72, substantially parallel to the feeder slots 54. The shank 73 of the finger 59 is received in said groove and is provided with a longitudinally extending slot 74. A headed pin 75 takes through said slot and is fixed to shoe 61 to permit longitudinal movement of shank 73 while retaining it against displacement from groove 72.

While each of the fingers 59 in the machine could be adjusted individually and held in adjustment by a nut turned down on the pin 75, such a procedure would be tedious and time consuming. I prefer, therefore, to provide means for adjusting the position of all the fingers simultaneously. To this end, I provide a bar member 76 spanning the frame 11 and overlying the shoe members 61. The bar is provided, for each shoe 61, with a longitudinally extending slot 77. A pin 77' projects upward from finger shank 73 and into slot 77.

A pair of rods 78 are supported on suitable brackets on opposite sides of frame 11 and project beneath the opposite ends of bar 76. A sleeve member 79 is telescopically received over the end of each such rod and the ends of bar 76 are fixed thereto. Coiled springs 80 are sleeved on rods 78 and bear against members 79 to urge bar 76 resiliently away from the ends of slats 52 and 53. (See Fig. 12.)

A shaft 81 is journalled in frame 11 along an axis intersecting the axes of rods 78. Shaft 81 has fixed thereto a pair of cam members 82 against which the ends of members 79 are held by springs 80. A handwheel 83 is preferably fixed to shaft 81 for rotary adjustment of cams 82, and set-screws 84 engage shaft 81 to hold it in a predetermined position. Thus, upon rotation of shaft 81, the cams 82 will cause the bar 76 to move toward or away from bed 19 thereby shifting all the fingers 59 simultaneously toward or away from the mating fingers 58.

I claim as my invention:

1. In a machine of the class described, the combination of a nail feeder mechanism comprising a downwardly inclined bed provided with a plurality of slots extending from the lower edge to the upper edge thereof and adapted each to receive and hold therein a single file of nails hanging from their heads, picker means for blocking the lower end of each of said slots to prevent the escape of nails therefrom but operable to open said lower ends to release the nails serially from said slots, and hopper means for delivering the nails into the slots in said feeder mechanism comprising a box mounted for swinging movement about a lower edge thereof upon a substantially horizontal axis substantially through the upper ends of said slots, and means for positively driving said hopper means both upwardly and downwardly to oscillate said box between a position substantially in the plane of the bed of said feeder mechanism and a position oppositely inclined from said plane, said driving means causing said box to dwell momentarily in its first-said position, to move slowly out of its first-said position and then sharply into its second-said position, and to return relatively rapidly, with a sudden stop, to its first-said position.

2. In a machine of the class described, the combination of a nail feeder mechanism comprising a downwardly inclined bed provided with a plurality of slots extending from the lower edge to the upper edge thereof and adapted each to receive and hold therein a single file of nails hanging from their heads, picker means for blocking the lower end of each of said slots to prevent the escape of nails therefrom but operable to open said lower ends to release the nails serially from said slots, and hopper means for delivering the nails into the slots in said feeder mechanism comprising a box mounted for swinging movement about a lower edge thereof upon a substantially horizontal axis substantially through the upper ends of said slots, and means for driving said hopper means, comprising a first shaft mounted for rotation about a substantially horizontal axis, means operatively connected to drive said shaft in one direction, a crank member fixed to said first shaft for rotation thereby, a second shaft spaced from said first shaft and substantially parallel thereto, a bell-crank member mounted for oscillation about the axis of said second shaft, a first link means pivotally connected to said crank member and to one arm of said bell-crank member, and a second link means pivotally connected to the other arm of said bell-crank member and to the box of said hopper means, the combined lengths of said first link means and said one arm of said bell-crank member being slightly greater than the length of said crank member added to the distance between said first and second shafts.

3. In a machine of the class described, the combination of a nail feeder mechanism comprising a downwardly inclined bed provided with a plurality of slots extending from the lower edge to the upper edge thereof and adapted each to receive and hold therein a single file of nails hanging from their heads, picker means for blocking the lower end of each of said slots to prevent the escape of nails therefrom but operable to open said lower ends to release the nails serially from said slots, and hopper means for delivering the nails into the slots in said feeder mechanism comprising a box mounted for swinging movement about a lower edge thereof upon a substantially horizontal axis substantially through the upper ends of said slots, and means for driving said hopper means, comprising a shaft mounted for rotation about an axis substantially parallel to the axis of oscillation of said box but spaced downwardly therefrom, fulcrum means spaced from said shaft in the direction of said box on an axis substantially parallel to said shaft, motor means for driving said shaft in one direction, a crank arm fixed to said shaft for rotation thereby, a bell-crank lever mounted for oscillation about the axis of said fulcrum means, a first link connected at one end to said crank arm and at the other end to one arm of said bell-crank lever, pivot means provided on the lower side of said box at a point spaced from the axis of oscillation of said box, and a second link pivotally connected at one end to the other arm of said bell-crank lever and at the other end to the said pivot means on said box, the combined length of said first link and said one arm of said bell-crank lever being slightly greater than the length of said crank arm added to the distance between said shaft and said fulcrum means.

4. In a machine of the class described, the combination of a nail feeder mechanism comprising a downwardly inclined bed provided with a plurality of slots extending from the lower edge to the upper edge thereof and adapted each to receive and hold therein a single file of nails hanging from their heads, picker means for blocking the lower end of each of said slots to prevent the escape of nails therefrom but operable to open said lower ends to release the nails serially from said slots, and hopper means for delivering the nails into the slots in said feeder mechanism comprising a box mounted for swinging movement about a lower edge thereof upon a substantially horizontal axis substantially through the upper end of said slots, and means for driving said hopper means to oscillate said box between a position substantially in the plane of the bed of said feeder mechanism and a position oppositely inclined from said plane, said driving means causing said box to dwell momentarily in its first-said position, to move slowly out of its first-said position and then sharply into its second-said position, and to return relatively rapidly to its first-said position, said picker mechanism comprising, for each of said slots, a pair of fingers projecting toward each other along lines substantially normal to said slot, track means extending along the lower end of said bed but spaced slightly therefrom, a slide member guided for movement on said track means and supporting said fingers, with one of said pair normally blocking the lower end of its associated slot and with the other of said pair projecting toward the adjacent slot but terminating normally just short of such slot, and driving means for said slide member comprising a further member guided for reciprocation along a path adjacent to said slide member and substantially normal to the direction of length of said track means, one of said members being provided with a slot angularly arranged relative to the bed of said feeder mechanism, and the other of said members being provided with a pin cooperatively engaging in said slot, and motor means drivingly connected to said further member to so reciprocate said member, said other finger being off-set from said one finger toward the upper end of said slat members a distance slightly greater than the diameter of one of said nails.

5. The combination of claim 4 in which said other finger is supported on said slide member for adjustment along a line substantially parallel to its associated bed slot, a bar member adjacent said slide member and extending along a line substantially parallel to said track means, means operatively connected to said bar member for shifting it bodily toward and away from the adjacent end of the bed of said feeder mechanism, said other finger being operatively connected to said bar member for movement therewith toward and away from said bed but free for relative movement in the direction of said track means.

6. In a machine of the class described, a hopper comprising a box mounted for swinging movement about a lower edge thereof along a substantially horizontal axis between a position inclined upwardly from the horizontal plane including said axis, and a position oppositely inclined from said plane, and means operatively connected to move said box between said positions comprising a first shaft substantially parallel to the axis of said box but spaced downwardly therefrom, a second shaft substantially parallel to the axis of said first shaft but spaced therefrom toward said box, motor means for driving said first shaft in one direction, a crank arm fixed for rotation by said first shaft, a bell-crank lever mounted for oscillation about the axis of said second shaft, a first link means pivotally connected between the distal end of said crank arm and one arm of said bell-crank lever, and a second link means drivingly connected at one end to said box and pivotally connected at the other end to the other arm of said bell-crank lever, the combined length of said one arm of said bell-crank lever and said first link being slightly greater than the lenth of said crank arm added to the distance between said first and second shafts.

7. The device of claim 6 in which the floor and front wall of said box intersect substantially along the swinging axis of said box, said floor being formed with a plurality of slots opening through the front edge thereof and retreating from said edge, said box including rib members projecting above said box floor between the adjacent slots therein, and a finger for each of said rib members upstanding therefrom at points spaced rearwardly from the front wall of said box, the front wall of said box being provided along its lower edge with an aperture opening toward each of the slots in said box.

8. The device of claim 7 in which said slots are adjustable in width, including a masking plate for the apertures in the front wall of said box, said plate being provided with a plurality of sets of notches opening through the lower edge thereof, the notches of each set being of a uniform width differing from the width of the notches of any other set, the notches of any given set being registerable concurrently with the slots in said box floor, said masking plate being adjustable transversely of said slots to bring said sets of notches selectively into registry with the slots in said box floor.

9. A nail feeder mechanism comprising a hopper having a bed, means supporting one end of said bed for oscillation about a substantially horizontal axis, the floor of said bed being formed to define a plurality of longitudinally-extending slots opening through said one end, and means for swinging the opposite end of said bed through an arc extending above and below the horizontal plane including said axis, said last-named means including a rotor, and means providing a two-way driving connection between said rotor and said hopper and translating constant-velocity rotation of said rotor into oscillatory movement of said opposite bed end from its uppermost position slowly to a position substantially in said horizontal plane, then at a velocity substantially greater than that of free-falling nails, to its lowermost position, and then quickly to a sudden stop in its uppermost position, whereby a mass of nails carried in said hopper is caused to leave said bed twice in each cycle of oscillation thereof.

10. A nail feeder mechanism comprising a hopper having a bed, means supporting one end of said bed for oscillation about a substantially horizontal axis, the floor of said bed being formed to define a plurality of longitudinally-extending slots opening through said one end, and means for swinging the opposite end of said bed through an arc extending above and below the horizontal plane including said axis, said last-named means including a rotor, and means providing ta two-way driving connection between said rotor and said hopper and translating constant-velocity rotation of said rotor into oscillatory movement of said opposite bed end from its uppermost position to a position substantially in said horizontal plane within approximately 160° of movement of said rotor, then to its lowermost position within approximately 50° of movement of said rotor, then gradually away from its lowermost position through approximately 40° of movement of said rotor, and then quickly to a sudden stop in its uppermost position within approximately 110° of movement of said rotor.

11. A nail feeder mechanism comprising a hopper having a bed, means supporting one end of said bed for oscillation about a substantially horizontal axis, the floor of said bed being formed to define a plurality of longitudinally-extending slots opening through said one end, and means for swinging the opposite end of said bed through an arc extending above and below the horizontal plane including said axis, said last-named means including a rotor mounted on a horizontal axis spaced from said first-named axis, fulcrum means spaced from said rotor means and closer to said first-named axis, a first arm oscillable about said fulcrum means, a first link means pivotally connected between said rotor and said first arm, a second arm fixed to move with said first arm, and a second link means pivotally connecting said second arm with said bed.

12. For use with a slotted nail guide, picker mechanism comprising a pair of overlapping, inwardly-directed fingers, the overlapping ends of said fingers being offset in a direction normal to the direction of projection of said fingers, a rail mounted adjacent the delivery end of said guide and extending transversely relative to said guide, a shoe member slidably supported from said rail and supporting said fingers, a slide member, guide means normally fixed relative to said rail and engaging said slide member to guide the same in a path transverse relative to the length of said rail, interengaging cam means on said shoe member and on said slide member to translate reciprocation of said slide member along said path into reciprocation of said shoe member along said rail, spring means normally holding said slide member at one end of its path, and an electric motor effective, when energized, to shift said slide member, against the tendency of said spring means, toward the opposite end of its path.

13. The machine of claim 12 in which said shoe member is provided with a trackway substantially normal to said rail and to said slide member path, one of said fingers being mounted for reciprocatory movement along said trackway, and means for securing said one finger in any one of a plurality of positions of adjustment along said trackway.

14. The device of claim 13 in which said last-named means comprises a bar member arranged adjacent said shoe member and extending substantially parallel to said rail, said bar member having a longitudinal slot formed therein substantially at right angles to said trackway and opening toward said shoe member, said finger in said trackway having a pin taking into said slot in said bar member, and adjustment means for said bar member for moving it laterally toward and away from the adjacent end of said nail guide.

15. The device of claim 14 in which the adjustment means for said bar member comprises a pair of spaced rods fixed on substantially parallel axes substantially parallel to the plane of said nail guide and normal to said bar member, a shaft journalled for rotation about an axis passing substantially through the axes of said rods and substantially perpendicular thereto, a cam fixed on said shaft substantially in the axis of each of said rods, a sleeve member carried by each of said rods and bearing at one end against the respective cams, said bar member spanning said sleeve members and fixedly supported thereon, and means holding said sleeve members yieldingly in engagement with said cams.

References Cited in the file of this patent

UNITED STATES PATENTS

| | | |
|---|---|---|
| 221,844 | Messer | Nov. 18, 1879 |
| 265,166 | Smith et al. | Sept. 26, 1882 |
| 276,639 | Smith et al. | May 1, 1883 |
| 403,843 | Junkins | May 21, 1889 |
| 409,145 | Grammes | Aug. 13, 1889 |
| 555,572 | Gruendel | Mar. 3, 1896 |
| 1,112,083 | Northrup | Sept. 29, 1914 |
| 2,540,934 | Cook et al. | Feb. 6, 1951 |